Feb. 4, 1969  H. W. MORRIS  3,425,714
LIFTING JACK FOR HAY BALERS
Filed July 10, 1967  Sheet 1 of 2
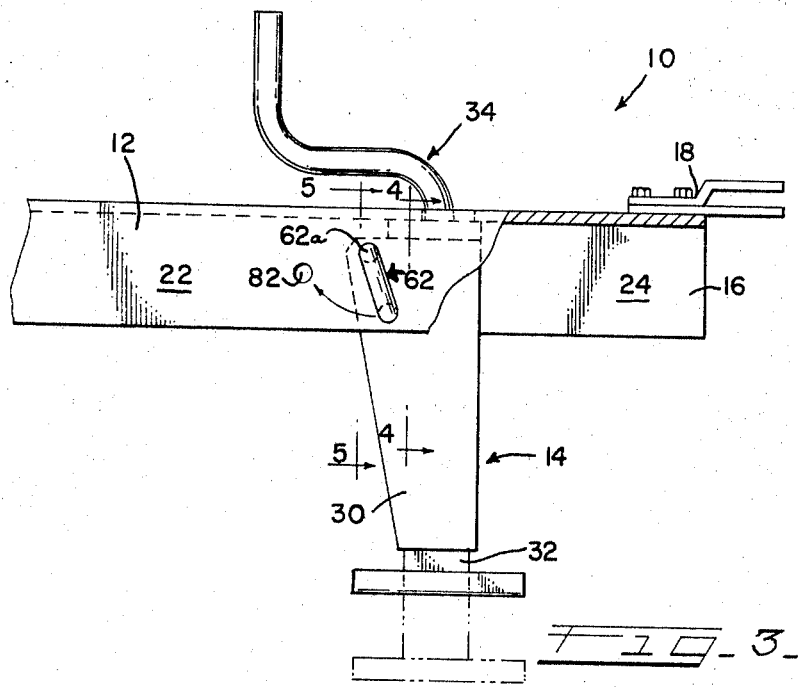
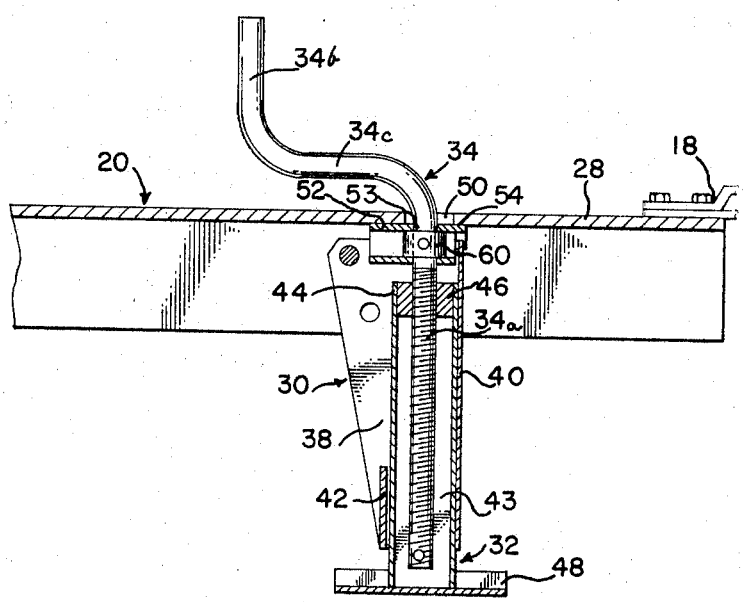
INVENTOR
HUGH W. MORRIS
BY
ATT'Y.

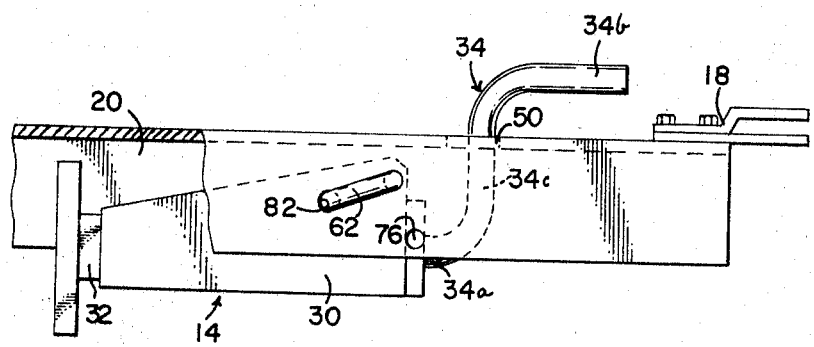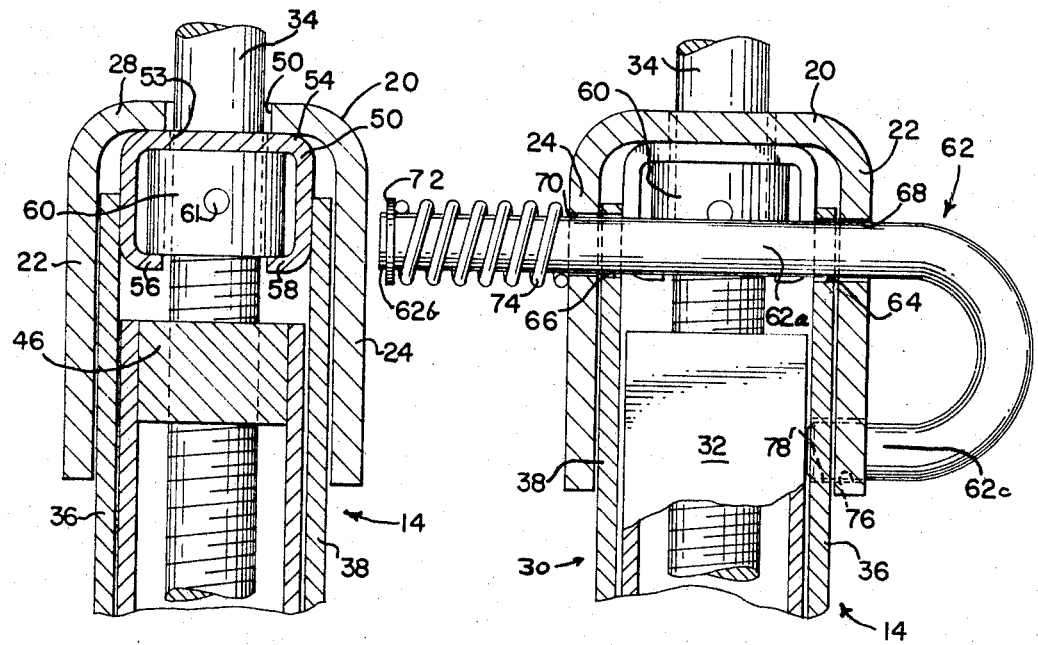

United States Patent Office 3,425,714
Patented Feb. 4, 1969

3,425,714
LIFTING JACK FOR HAY BALERS
Hugh W. Morris, Corinth, Miss., assignor to International Harvester Company, Chicago, Ill., a corporation of Delaware
Filed July 10, 1967, Ser. No. 652,055
U.S. Cl. 280—475
Int. Cl. B60d 1/14; B60s 9/00, 9/02
8 Claims

ABSTRACT OF THE DISCLOSURE

A trailer hitch for use with towed farm implements and having a jack assembly mounted on one end thereof. The jack assembly is swingable between a vertical supporting position and a horizontal transport position, and includes a pair of relatively extensible members and an adjustable crank. The crank includes a lever portion operable in a plane above the hitch for changing the extension of the extensible members and hence the elvation of the hitch.

Background and summary of the invention

The present invention involves an improvement in a trailer hitch and more specifically a trailer hitch-jack combination for use with towed farm implements.

A self-supporting trailer hitch of the type used with farm implements should be designed to: (1) provide for stable support when the implement is not in use, (2) provide for easy adjustment, and (3) include means for transporting the supporting stand in a compact condition which presents minimum obstruction to the maneuverability and operability of the implement. Furthermore, the hitch should be simple in construction and operation.

The self-supporting hitches presently used on farm implements attain the design goals with varying degrees of success. However, emphasis on one of the design features generally is at the expense of the other features. For example, an easily adjustable trailer hitch often demonstrates inferior supporting characteristics or presents unwanted projections.

The purpose of the present invention is to provide a simple and convenient adjustment means for a common screw jack attached to a hitch without sacrificing the supporting capacity of the jack assembly. The jack assembly is mounted at the forward end of the hitch and has a lever disposed above the hitch for convenient manipulation. The jack assembly and crank are movable as a unit to a partially retracted position within the hitch, an arrangement which minimizes obstruction to maneuverability and operation of the implement.

The objects of the present invention are briefly:

To provide a self-supporting trailer hitch having integral adjustment means positioned for convenient manipulation;

To provide a trailer hitch having a jack assembly swingable between a vertical, supporting position and a retracted, transport position; and To provide a jack assembly that is self-locking in both the transport position and support position.

These and other objects will become more apparent from the following disclosure taken in conjunction with the attached drawings in which:

FIGURE 1 is a side elevational view of the self-supporting hitch shown in the ground supporting position with portions broken away;

FIGURE 2 is a side elevational view showing the hitch in the elevated transport position with portions broken away;

FIGURE 3 is a longitudinal sectional view of the hitch shown in FIGURE 1;

FIGURE 4 is an enlarged fragmentary view showing a transverse section taken generally along line 4—4 of FIGURE 1; and FIGURE 5 is an enlarged fragmentary view showing a transverse section taken generally along line 5—5 of FIGURE 1.

Description of the preferred embodiment

As shown in FIGURE 1 a self-supporting trailer hitch 10 constructed in accordance with the principles of the present invention comprises generally a tow bar 12 and a jack assembly 14 pivotally mounted at a forward end thereof. The rearward end (not shown) of the tow bar 12 is adapted to be secured to a towed implement and a forward end 16 is provided with a clevis 18 for connection with a towing vehicle such as a tractor (not shown).

As illustrated in FIGURE 4 the tow bar is in the form of a downwardly facing channel 20 having a pair of parallel, vertical walls 22 and 24 interconnected at their upper ends by horizontal wall 28. The parallel walls 22 and 24 are laterally spaced to receive the jack assembly 14 therebetween.

Details of the jack assembly will be described with reference to the jack assembly in its supporting position as depicted in FIGURES 1, 3, 4 and 5. As best seen in FIGURE 1, the jack assembly 14 may be considered as having generally a frame 30, a foot 32, and a crank 34. Now, referring specifically to FIGURES 3 and 4, the frame 30 includes a pair of laterally spaced plates 36 and 38, the front edges of which are interconnected by a vertical front plate 40. Spaced from plate 40 and extending parallel thereto is a rear plate 42 which interconnects lower and rearward portions of side plates 36 and 38. The side plates 36 and 38, the front plate 40, and the rear plate 42 in combination define a guideway 43 for receiving the foot 32.

The foot 32 is an elongate member of rectangular cross-section having such dimensions that it fits snugly into the guideway 43. The foot 32 is telescopically movable into and out of the frame 30 between a retracted position (solid line position of FIGURE 1) and an extended position (broken line position of FIGURE 1) by means to be discussed presently. An upper end 44 of the foot 32 is disposed within frame 30 and carries a threaded collar 46. Secured to the lower end of foot 32 is a shoe 48 which is adapted to abut the ground in a supporting relation.

The crank 34 provides the means for moving the foot 32 relative to the frame 30 and includes a vertical stem 34a, a portion of which is threadedly connected to the collar 46. The stem 34a extends through a slot 50 formed in the horizontal wall 28 of channel 20 and concentrically through foot 32.

At the upper extremity of the frame 30 and extending a short distance thereabove is a bracket 52 which is attached to side walls 36 and 38 (see FIGURE 4). The bracket 52 has a horizontal bearing surface 54 arranged to abut the underside of horizontal wall 28 in a supporting relation. The bracket 52 is provided with a vertical opening 53 aligned with opening 50 to permit stem 34a to extend vertically from an elevation above channel 20 through the bracket 52 into foot 32. A pair of inwardly turned legs 56 and 58 extending downwardly from bearing surface 54 support a collar 60 attached to stem 34a by pin 61. The collar 60 fits snugly in bracket 52 and provides the means for imparting telescopic movement of the foot 32 relative to the frame 30 upon revolvement of stem 34a. In order to facilitate manual manipulation of the stem 34 the crank 34 is S-shaped having a vertically disposed handle 34b and a horizontal lever 34c interconnecting the handle 34b and the stem 34a (see FIGURE 3).

Thus it will be appreciated that the jack 14 is adjusted by manipulating the crank 34 at an elevation above the channel 20. This particular arrangement affords a convenient and simple means for adjusting the elevation of the tow bar 12.

The entire jack assembly 14 is swingable to a transport position (FIGURE 2). As best seen in FIGURE 5, a J-shaped locking member designated generally as 62 provides the pivot point for the jack assembly 14 and provides the means for locking the jack assembly 14 to the channel 20. Openings 64 and 66, respectively, formed in side plates 36 and 38 are aligned with similar openings 68 and 70 formed in walls 22, 24 for receiving a rod portion 62a of the locking member 62. The rod 62a extends beyond wall 24 and terminates at end 62b on which is mounted a cap 72. A coil spring 74 positioned between the cap 72 and the wall 24 urges the locking member 62 to the left as viewed in FIGURE 5. The opposite end of the rod 62a is in the form of a hook, terminating at end 62c which projects through an opening 76 formed in wall 22 and an opening 78 formed in plate 36. The coil spring 74 urges the end 62c in constant engagement with the foot 32. Thus it will be appreciated that the locking member 62 is movable laterally within the confines of openings 64, 66, 68 and 70, but, because end 62c is anchored in opening 76 and 78, is non-pivotable. This arrangement locks the jack assembly 14 to the channel 20 in a rigid vertical supporting position.

To place the hitch 10 in the transport position (FIGURE 2) the locking member 62 is moved to the right (FIGURE 5) until end 62c clears openings 76 and 78; the jack assembly 14 is swung about rod section 62a into the space between walls 22 and 24; the locking member 62 is turned and end 62c is aligned with an opening 82 formed in wall 22 whereupon end 62c lodges therein, locking the jack assembly 14 in the horizontal transport position.

As the jack assembly 14 is swung to its transport position the lever 34c, which in its operative position is disposed above the channel 20, passes through the slot 50. The slot 50 and lever 34c are particularly shaped and arranged so as to permit easy passage of the latter through the former. In the transport position, (FIGURE 2) the lever 34c extends vetrically through slot 50 and because the restrictions of the slot 50 prevents rotation of crank 34, the jack assembly 14 is locked in a non-extensible disposition. The handle 34b in the transport position extends forwardly and parallel to the channel 20 at a elevation slightly thereabove, a position which minimizes undesirable projections. A particular feature of this invention is the disposition of the jack assembly 14 and crank 34 in the transport position, both of which are substantially retracted within the channel 20.

In describing the operation let it be assumed that the jack assembly 14 is in the vertical position supporting a farm implement, and that it is desired to transport the implement. The drawbar of a tractor is connected to clevis 18, the elevation of the tow bar 12 and clevis 18 being adjusted by manipulation of crank 34, if necessary. After the tow bar 12 is connected to the drawbar the jack 14 is screwed to its minimum extension wherein the foot 32 is substantially retracted into frame 30. This clears the foot 32 from the ground and permits easy swinging of the jack assembly 14 rearwardly to its transport position. The jack is unlocked by pulling the hook of locking member 62 outwardly. The jack 14 is then swung rearwardly and lodged in channel 20. Locking member 62 is turned and end 62c is inserted through aligned openings 82 of channel 20 and 78 of jack 14, thereby firmly locking the assembly in a rigid transport position.

The jack assembly 14 is returned to its vertical supporting position by merely moving the locking member 62 to the right as viewed in FIGURE 5. When the end 62c clears opening 78 the jack 14 swings by gravity from the horizontal to the vertical position. Note that the flat bearing surface 54 engagement upon the companion surface of the channel limits the swinging of the jack 14 and thereby facilitates the transfer of the jack assembly to its supporting position. When in the vertical position, the jack assembly is locked in place by inserting end 62c of locking member 62 through aligned openings 76 and 78. Thus it has been demonstrated that the jack assembly of this invention features high support capacity, simple adjustment, and convenient transportability.

What is claimed is:

1. A self-supporting trailer hitch comprising:
    a tow bar having a vertical opening therethrough,
    a jack mounted on said tow bar and arranged therewith in a vertical ground supporting relation, said jack including means for varying the elevation of said tow bar;
    a crank having a lever portion disposed above said tow bar and a stem portion extending through said opening of said tow bar, said stem portion connected to said means whereby actuation of said lever varies the elevation of said tow bar,
    said crank and said jack being swingable as a unit to a transport position wherein said lever portion is substantially retracted through said opening of said tow bar.

2. A trailer hitch as recited in claim 1 wherein:
    said tow bar includes a longitudinal opening for receiving said jack in its transport position.

3. A trailer hitch as recited in claim 1 wherein:
    said crank includes a handle connected to said lever portion, said handle being disposed above and parallel to said tow bar with said crank in said transport position.

4. A self-supporting trailer hitch for use with towed farm implements, said hitch comprising:
    a tow bar having a vertical opening therethrough;
    a supporting jack pivotally mounted on said tow bar and swingable in a vertical plane between a horizontal transport position and a vertical supporting position, said jack having a pair of relatively extensible elements, one of said elements engageable with the ground and the other of said elements abuttable with said tow bar when said jack occupies said vertical supporting position
    a crank conected to said jack for manually varying the extension of said extensible elements, said crank extending through said opening and projecting above said tow bar, said crank being particularly contoured to permit partial retraction thereof through said opening attendant to said jack being moved to said transport position.

5. A trailer hitch as recited in claim 4 wherein said tow bar includes a downwardly facing channel member having a pair of parallel vertical walls interconnected by a horizontal wall, said opening being formed in said horizontal wall and said parallel walls being horizontally spaced to receive said jack therebetween with said jack in said transport position;
    said trailer hitch further comprising means for locking said jack in said transport and said supporting positions.

6. A trailer hitch as recited in claim 4 wherein one of said extensible elements includes a collar, said crank being threadedly connected to said collar whereby rotation of said crank with said jack in said vertical position varies the extension of said extensible elements.

7. The trailer hitch as recitde in claim 6 wherein:
    said crank includes a stem portion extending through said opening and having a lower end threaded to said collar and an upper end disposed above said horizontal wall,
    a lever portion extending perpendicular from said upper end of said stem position,
    and a handle portion extending perpendicularly and upwardly from the outer end of said lever portion whereby rotation of said crank about the axis of said stem portion varies the extension of said extensible parts, said portions being integrally formed and movable with said jack to a transport position wherein said lever portion is partially retracted into said tow bar through said opening.

8. A trailer hitch for towed vehicles, said trailer hitch comprising:

a forwardly extending tow bar having a vertical opening formed therein;

a screw jack having:
  a first part pivotally mounted on said tow bar at a point rearwardly of said opening, said first part including a bearing surface arranged to abut a companion surface on said tow bar in a supporting relation, said bearing surface having an opening formed therein and aligned with said tow bar opening, and a second part telescopically movable in said first part, said second part having a threaded connector secured thereto and a ground engaging shoe; and a crank including:
    a stem extending through said openings and having an upper end disposed above said tow bar and a lower end threaded to said connector,
    said stem being journaled to said bearing surface, whereby rotation of said stem telescopically moves said first part relative to said second part, and a lever integrally connected to said upper end of said stem and extending transversely therefrom, said lever having gripping means for manually revolving said stem, said jack and said crank being pivotable rearwardly and upwardly in relation to said tow bar to a transport position wherein said jack and said stem extend parallel to said tow bar and opposite ends of said lever are disposed on either side of said opening in said tow bar, the walls of said opening engaging an intermediate portion of said lever thereby restricting rotation thereof.

References Cited

UNITED STATES PATENTS tricting rotation thereof.

| | | | |
|---|---|---|---|
| 2,634,941 | 4/1953 | Eckert | 280—150.5 |
| 2,750,205 | 6/1956 | Russell | 280—150.5 |
| 3,273,733 | 9/1966 | Schuler | 280—475 X |

FOREIGN PATENTS 645,078   9/1950   Great Britain.

LEO FRIAGLIA, *Primary Examiner.*

U.S. Cl. X.R.

254—86; 280—150.5